United States Patent Office 2,708,123
Patented May 10, 1955

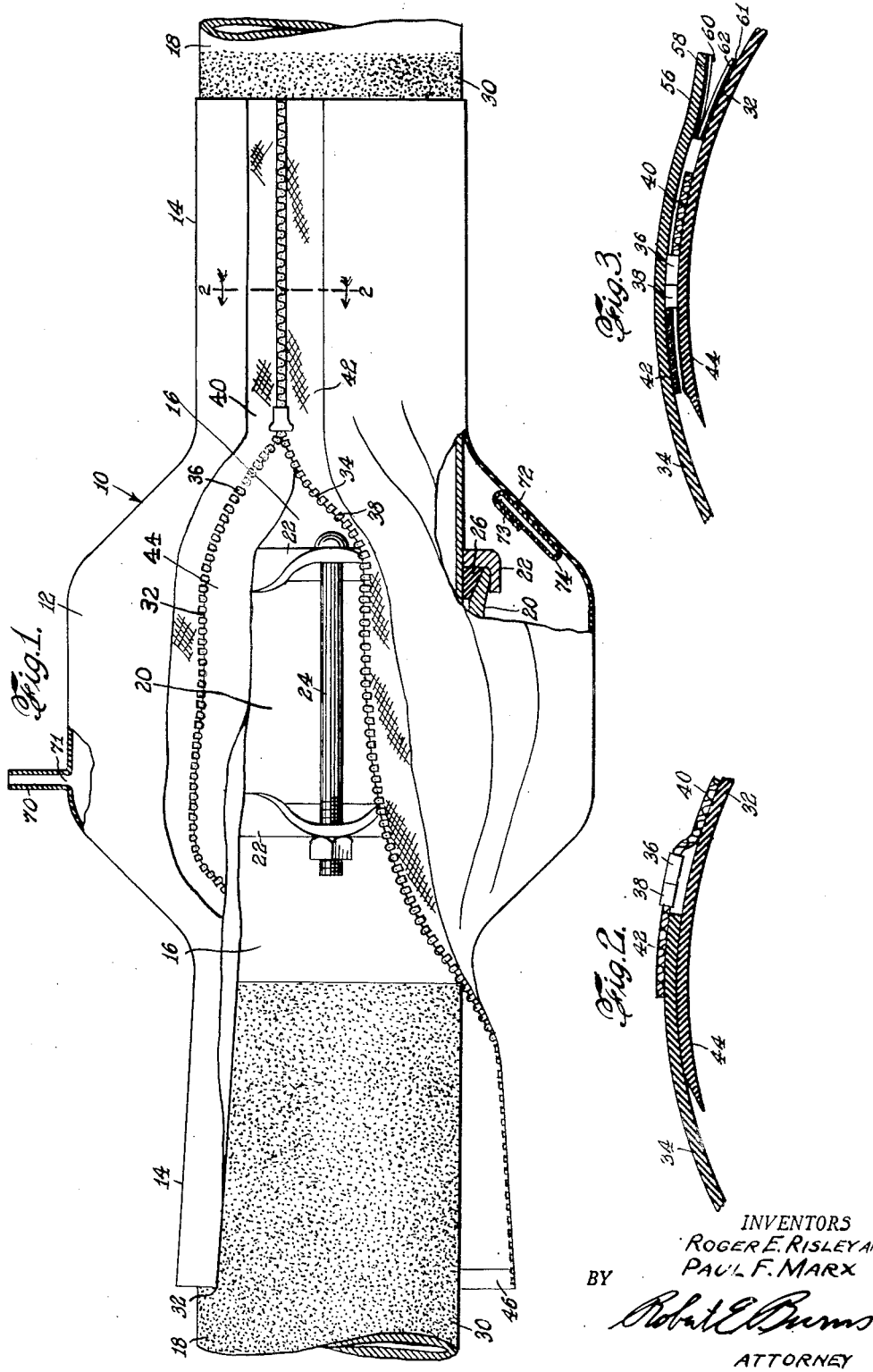

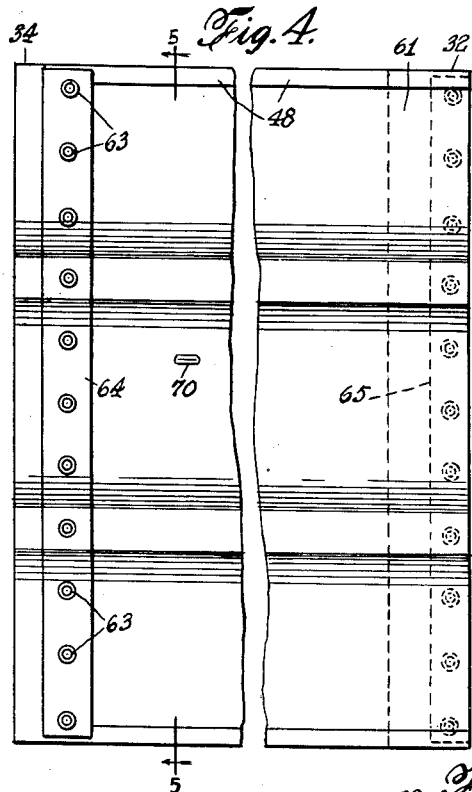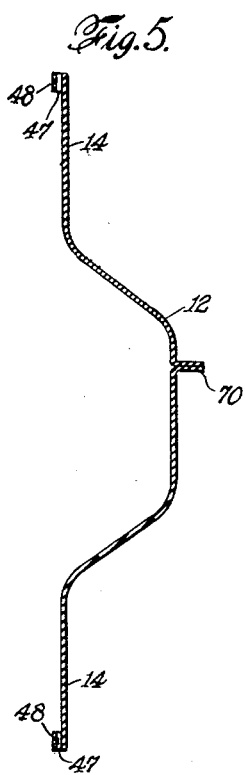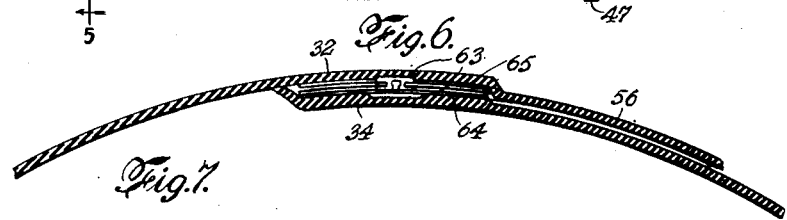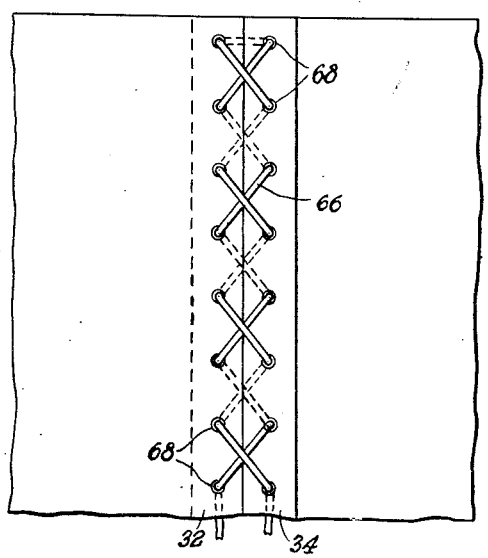

2,708,123

PIPE JOINT PROTECTOR

Roger Emanuel Risley and Paul F. Marx, Bradford, Pa., assignors to Dresser Industries, Inc., Cleveland, Ohio, a corporation of Pennsylvania Application January 24, 1950, Serial No. 140,214

6 Claims. (Cl. 285—98)

This invention relates to the protection of pipe lines against corrosion and is more particularly concerned with a device for protecting the joints in underground pipe lines from the destructive action of the soil, water and electric ground currents.

Long-distance pipe lines for the transmission of oil, water, gas, and the like are customarily formed from many sections of steel pipe interconnected by coupling elements which provide a fluid-tight seal between the pipe sections but at the same time provide a sufficiently flexible joint to accommodate the expansion and contraction of the line under the conditions of service. The couplings commonly in use for this purpose consist of sleeves or "middle rings" which are slipped over the ends of the adjacent pipe sections, and "followers" which are slipped over the pipe sections on each side of the middle ring and are then drawn against the ends of the middle ring by means of bolts. Suitable gaskets placed at the ends of the middle rings are compressed by the action of the followers to provide a fluid-tight seal.

It is well known that these pipe lines are continuously subject to corrosion attack by water and by the soil through which they pass, and are also frequently exposed to the destructive action of electric currents. A major practical problem in the construction of pipe lines of this type is, consequently, the adequate protection of the lines from these destructive agencies. It is of great practical importance to reduce to a minimum the need for repair or replacement of parts, since such maintenance is expensive and time consuming and necessitates costly interruptions in service. It is customary, therefore, to coat the exterior of the pipes with various types of protective coverings, for example, bituminous coating compositions, fibrous bitumen-impregnated shields, and the like. Protective coverings of this type are well known and extensively used.

Generally, the protective coating or other protective covering is applied in the field, i. e., the pipes are treated at the side of the trench in which they are to be laid. Either individual pipe sections are coated and/or wrapped and are thereafter coupled, or, coupled sections are treated by means of portable coating and wrapping machines which are moved along the assembled line. When treated before assembly, the pipes are customarily supported on rigs which permit the pipes to be rotated, thereby facilitating the application of the coating.

In either method of application the couplings present a special problem in attaining full protection for the line. In the case of application before assembly, it is customary to leave the portions at each end of the pipe section uncoated, in part to permit the proper mounting of the couplings, and in part because the end portions rest on the rollers of the supporting rig. In the case of application after assembly, it is customary to guide the coating and wrapping machines as close to the coupling as possible and then to interrupt the application and resume it on the other side of the coupling.

Special methods have, therefore, been devised to protect the coupling. Methods commonly employed involve the hand application of coatings or suitable wrappings. Such treatment is expensive, time-consuming and not fully satisfactory for the reason that the various projecting surfaces of the coupling are difficult to reach and to cover with a uniform layer of material.

If a sufficiently fluid coating composition is used to insure penetration into all of the crevices of the coupling and permit the desired coverage of all exposed portions, the coating is necessarily so soft that it is unduly susceptible to the abrasive action of the soil. As a result, the coating film is soon injured and the coupling is exposed to attack. In order to avoid this difficulty, it has been proposed to surround the coupling and the adjacent pipe ends with a thick layer of a plastic material. Such material, however, requires a bulky, complicated housing for its application. In some cases the housing is removed after the plastic composition, which is poured into the housing as a hot fluid, has cooled and hardened, while in other instances the housing forms a permanent part of the installation. It has been proposed, for example, to assemble the housing around the coupling and then to fill the housing with the plastic protective material heated to the extent necessary to render it fluid. A suitable aperture is provided in the top of the housing through which the hot fluid material is poured. The housing aperture is then closed and the coating allowed to cool and harden.

This method of treatment has the disadvantage of being time-consuming and requiring special tools, materials, and relatively skilled labor. Not only is the assembly of the housing a major task but care must be taken in pouring the molten coating composition to drive out all of the air in order that all exposed surfaces of the coupling will be reached and covered. This requires careful control both of the temperature of the composition and the rate of pouring. Furthermore, the bulkiness of the housing makes it difficult to apply after the pipe has been laid in the trench and working space is limited, a situation which occurs in some types of installation.

It is an object of the present invention to provide an improved device for use in protecting the couplings in pipe lines against corrosion attack.

It is another object of the invention to provide a device of the character indicated which may be easily and rapidly applied with unskilled labor.

It is a still further object of the invention to provide a coupling-protecting device which may be applied without special tools of any kind.

According to the invention, there is provided a coupling protector comprising an appropriately formed sheet of flexible, non-conducting material provided with complementary closure means along the longitudinal edges thereof. The sheet is proportioned to provide a central section of sufficient diameter to encircle the coupling, and end portions adapted to grip the ends of the adjacent pipe sections. The device needs only to be wrapped around the coupling and the complementary closure means interengaged to provide an effective, corrosion-resistant covering for the coupling and the ends of the adjacent pipe sections. Our coupling protector does not require machinery or special tools of any type for its application. It may be easily applied with unskilled labor, and it may be readily used in instances where the walls of the trench in which the pipe line is laid permit only limited movement.

It is a feature of the invention that our coupling protector is formed with end sections which are adapted to engage the pipe ends adjacent the coupling with a stretch fit when the device is applied, whereas the central portion of the device forms an enclosure of substantially greater diameter than the end sections with the result that the device is adapted to surround the coupling proper rather loosely. When the trench is filled and the pipe line buried, the pressure of the backfill presses the coupling protector against the irregular surfaces of the coupling without danger of rupture of the flexible sheet. Our coupling protector prevents the flow of electrical currents across the coupling and provides a corrosion-resistant protective covering for the coupling which is not susceptible to injury by the soil and is not loosened or cracked or otherwise damaged by the expansion and contraction of the coupling.

In one form of the invention, the coupling protector is provided with a pressure-responsive vent which permits the liberation of trapped air when the device is compressed by the action of the backfill.

In another form of the invention, the coupling protector is provided with means for maintaining within the coupling enclosure an agent for inhibiting the growth of anaerobic bacteria.

Other objects and features of the invention will be apparent from the following detailed description and from the drawings in which, Fig. 1 is a side elevation, partly in section, showing the application of the coupling protector to a typical pipe line joint;

Fig. 2 is a sectional view taken approximately along the line 2—2 of Fig. 1 showing the relationship of the longitudinal edges of the applied device;

Fig. 3 is a sectional view similar to Fig. 2 showing the longitudinal edges of another embodiment of the device;

Fig. 4 is a partial plan view of an embodiment of the coupling protector showing another type of closure;

Fig. 5 is a longitudinal section taken approximately along the line 5—5 of Fig. 4;

Fig. 6 is a sectional view of the overlapping portion of the device showing an alternative closure means, and Fig. 7 is a plan view showing another closure.

Referring to the drawings, and in particular to Fig. 1, the number 10 indicates generally a coupling protector embodying features of the present invention. Protector 10 comprises an enlarged central portion 12 adapted to encircle the coupling, and end portions 14 adapted to encircle the adjacent ends of the pipe sections with a stretch fit. The pipe line joint around which device 10 is applied comprises the ends 16 of pipe sections 18 suitably joined by a Dresser coupling or other joint formed from a sleeve or middle ring 20 and two opposed followers 22. When followers 22 are drawn together by the action of bolts 24, gaskets 26 are compressed between the ends of middle ring 20 and the surface of pipes 18 to provide a secure, fluid-tight, but flexible joint. The pipes 18 are provided with the usual protective coating 30 comprising, for example, coal-tar pitch or asphaltic material which forms a covering over the major portion of the exposed surface of the pipe sections but terminates somewhat short of coupling ends 16.

In the embodiment shown in Fig. 1, the two longitudinal edges 32 and 34 of the protector 10 are provided with complementary slide fastener sections 36 and 38, respectively. The slide fastener sections are mounted on conventional tabs 40 and 42 which are sewn or adhesively secured to the edges 32 and 34, respectively. The edge 32 is provided with a tongue 44 which underlies the fastener when it is closed and prevents contact between the fastener and the coupling.

Protector 10 may be made of natural rubber, or of a so-called synthetic rubber such as neoprene, or other flexible, non-conducting synthetic plastic material, and may be formed by molding, anodic deposition or other like process well known in the manufacture of mechanical rubber goods. Our coupling protector may be fabric reinforced if desired.

To apply the coupling protector 10 to the pipe joint, it is merely necessary to wrap it around the joint and to join the longitudinal edges 32 and 34 by engaging the closure means e. g., the slide fastener sections 36 and 38 shown in Fig. 1. Advantageously, a coating of the protective composition 30 or some other composition applied to the pipe section is also applied to the inside surface of ends 14 of protector 10 in order to improve the adhesive contact with pipes 18. Further, after protector 10 has been applied a further application of the coating composition is made at the juncture of ends 14 with pipes 18. The slide fastener is also advantageously coated to insure fluid tightness. This coating or sealing material may be that used to coat the pipe sections, e. g., any of the commonly used asphaltic or other bituminous pipe coating compositions, such as one having a melting point of 140° F. or above.

In order to facilitate application of our coupling protector and to insure an effective union of the end portions 14 with pipe sections 18, we advantageously provide these end portions with bonding aids. Referring particularly to Fig. 1, the end portion 14 is shown with a strip of fabric 46 secured thereto, as by stitching or by means of an adhesive. This fabric strip is of particular usefulness when the pipe coating composition comprises coaltar pitch, asphalt, or other bitumen. When protector 10 is itself formed from a fabric-backed sheet of rubber, neoprene or other flexible plastic material, the additional fabric strips on the pipe-contacting back of the protector are generally unnecessary. Fabric strips may, however, advantageously be secured to the exposed surface of the protector 10 along the ends 14 and the pipe coating composition applied over the ends 14 and the adjacent portions of pipes 18. Instead of fabric strips, the end portions 14 may be provided with adhesive strips 47, e. g., strips of a pressure sensitive adhesive material such as uncured rubber (Fig. 5). This is of particular advantage when the pipe coating composition employed has a rubber or resinous base rather than a bituminous base. In order to protect the pressure sensitive adhesive material before use, it may be covered with a masking strip 48, e. g., holland cloth, which may be stripped from the adhesive just before the protector 10 is applied.

In order to facilitate the sealing of the closure after protector 10 has been applied around the coupling and the ends of the adjacent pipe sections, the longitudinal edge 34 may be provided with a flap 56 which is adapted to overlie the closure member and to be secured to edge 32. In order to insure effective sealing of flap 56 to edge 32, the former is advantageously provided along its longitudinal edge with a strip of pressure-sensitive adhesive 58 similar to the strip on the ends 14 described above. A strip 60 of holland cloth or other masking fabric protects the strip 58 before use. A complementary strip of pressure-sensitive adhesive 61 is applied to edge 32 and similarly protected with a masking strip 62. When masking strips 60 and 62 are removed and adhesive strips 58 and 61 pressed together, a tight water-proof seal is obtained. When such sealing means is provided, the application of pipe coating material to the closure as previously mentioned may, if desired, be eliminated. It will be apparent, however, that in some cases it will be advantageous to apply the usual pipe coating material to the juncture of the longitudinal portions of the protector 10 and to the line of juncture of the protector and the pipe sections. This is very easily done and insures an effective seal.

Thus, in the preferred form of our invention, we provide our coupling protectors both with fabric strips 46 or other bond-improving means, a flap 56 and complementary adhesive strips 58 and 61, whereby there is provided a completely prefabricated pipe joint covering which requires no additional materials for its application other than the readily-available coating composition used for coating the pipe sections.

While in the embodiment hereinabove described, a slide fastener has been used as the closure means, it will be apparent that other closure means may be conveniently used. Referring particularly to Fig. 4 and Fig. 6, the longitudinal edges of our coupling protector may advantageously be joined by snap fasteners 63 of known construction. The two parts of the snap fastener are conveniently carried by fabric strips 64 and 65 which are secured, as by stitching or by an adhesive, to longitudinal edges 32 and 34. Alternatively, lacing 66, as shown in Fig. 7, may be employed as the closure means. Lacing 66 passes through eyelets 68 provided along edges 32 and 34. It will be apparent that other known fastening means such as mechanical clips, buttons and the like may be employed.

It will be observed that our joint covering device provides a complete enclosing means for the pipe line joint and requires no auxiliary plastic fillings of any kind. The central portion 12 fits loosely around the coupling and forms a continuous protective covering therefor. Under the pressure of the backfill, it is conformed without stress to the outline of the coupling when the pipe line is buried.

Since a certain amount of air may be entrapped in the space between the coupling and the central section 12, when protector 10 is applied, a valve is advantageously provided to permit release of this air under the pressure of the backfill. For this purpose, a flattened tubular vent 70 is secured to central section 12 and is placed over a suitable aperture 71 which permits escape of air through vent 70. Vent 70 may be made of the same flexible elastic material which is used to form protector 10 and may be formed integral with protector 10 or it may be separately formed and adhesively secured to the central portion 12 of our device. In normal position the walls of vent 70 are pressed together but may be separated by air pressure exerted during the compression of the central section 12 by the backfill.

In accordance with another feature of our invention, we also provide means for preventing or inhibiting the growth of anaerobic bacteria inside protector 10 after it has been applied and is in service. If conditions favoring the growth of such bacteria should occur, the useful life of our protecting device might be shortened. Accordingly, on the inner wall of central section 12, there is advantageously secured a small container 72 adapted to hold a supply of any convenient bactericidal or bacteriostatic agent, such as a salt of orthophenyl phenol or a flavine dye. The container 72 in the embodiment illustrated is a small bag having a cover flap 73 and provided with a number of small apertures 74 which permit access of air and/or moisture to the bactericidal agent. The container 72 is suitably stitched or adhesively secured to the wall of central section 12 and, after the container 72 has been filled, the flap is suitably secured to the walls of the container. Preferably, the container 72 is secured to the center portion of the central section 12 and the corrosion protector 10 is applied to the coupling in such a manner that the container 72 will lie at the bottom of the protector 10 in order to facilitate the reaction between moisture and the bactericidal agent, in the event any moisture is present.

Our coupling protector has, in practice, greatly simplified the heretofore difficult step of providing corrosion protection for the joints of long-distance pipe lines. It is readily and rapidly applied in the field under all conditions and requires no special skill, tools, or materials for successful application.

It will be apparent that various changes and modifications may be made in the herein-described embodiments without departing from the scope of the invention and it is intended, therefore, that all matter contained in the foregoing description and in the drawings shall be interpreted as illustrative and not in a limiting sense.

What we claim and wish to secure by Letters Patent is:

1. A corrosion protector for pipe joints including a coupling, comprising a flexible, elastic, non-conducting member adapted to be applied around a pipe coupling and the end portions of the pipe sections adjacent said coupling, complementary closure means along the longitudinal edges thereof, the end portions of said member being related to the diameter of the pipe in such manner that said member is stretched to fit around the pipe sections when the complementary closure means are interengaged, whereby said sheet surrounds said pipe sections with a stretch fit, and the central portion of said member being of a substantially greater dimension adapted to fit loosely around said coupling whereby to form a cylindrical enclosure for said pipe joint, the end portion of the enclosure being of substantially lesser diameter than the central portion thereof, a non-conducting tongue extending outwardly from one edge of said member adapted to underlie the closure means and to prevent conductive contact between the closure means and the pipe joint, a non-conducting flap extending outwardly from the other edge of said member adapted to overlie the closure, and a pressure sensitive adhesive along the longitudinal edge of said flap, whereby said flap may be adhesively secured to the outer surface of said member on the side opposite said other edge.

2. A corrosion protector for pipe joints including a coupling, comprising, a sheet-form flexible, elastic, non-conducting member adapted to be applied around a pipe coupling and the end portions of the pipe sections adjacent said coupling, complementary closure means along the longitudinal edges of said member, the end portions of said member being adapted to fit tightly around the pipe sections and the central portion of said member being of a substantially greater dimension and adapted to fit loosely around the coupling whereby to form a cylindrical enclosure for said pipe joint, the end portions of the enclosure being of substantially lesser diameter than the central portion thereof, and pressure responsive means in said central portion for venting said member when said member is applied around the coupling.

3. A corrosion protector for pipe joints as defined in claim 2, wherein said pressure responsive venting means comprises a flattened tube-like element.

4. A corrosion protector for pipe joints including a coupling, comprising a flexible, elastic, non-conducting member adapted to be applied around a pipe coupling and the end portions of the pipe sections adjacent said coupling, complementary closure means along the longitudinal edges of said member, the end portions of said member being adapted to fit tightly around the pipe sections and the central portion of said member being of a substantially greater dimension whereby to form a cylindrical enclosure for said pipe joint the end portions of the enclosure being of substantially lesser diameter than the central portion thereof and pressure-responsive means in said central portion for venting said member when said member is applied around the coupling.

5. A corrosion protector for pipe joints including a coupling, comprising a substantially sheet-form rubbery member adapted to be applied around a pipe coupling and the end portions of the pipe sections adjacent said coupling, complementary closure means along the longitudinal edges thereof, the end portions of said member being adapted to fit tightly around the pipe sections and the central portion of said member being of substantially greater dimension adapted to fit loosely around the coupling, whereby to form a cylindrical enclosure for said pipe joint the end portion of the enclosure being of substantially lesser diameter than the central portion thereof and pressure responsive means comprising a flattened tube-like element secured to the central portion of said member and communicating with an aperture in said member.

6. A corrosion protector as defined in claim 1 wherein the end edges of said end portions of said flexible member are provided with means for improving the adhesion of said portions to said pipe sections.

(References on following page)

References Cited in the file of this patent

UNITED STATES PATENTS

| | | |
|---|---|---|
| 336,199 | Bannister | Feb. 16, 1886 |
| 2,016,905 | Nathan et al. | Oct. 8, 1935 |
| 2,024,602 | Roberts | Dec. 17, 1935 |
| 2,025,635 | Bishoff | Dec. 24, 1935 |
| 2,082,175 | Sutherland | June 1, 1937 |
| 2,091,335 | Roberts et al. | Aug. 31, 1937 |
| 2,110,565 | Yeager | Mar. 8, 1938 |
| 2,219,202 | Swanson | Oct. 22, 1940 |
| 2,267,630 | Weiland | Dec. 23, 1941 |
| 2,522,072 | Tierney | Sept. 12, 1950 |
| 2,547,983 | Slattery | Apr. 10, 1951 |